United States Patent [19]

Ballegeer et al.

[11] Patent Number: 4,541,043
[45] Date of Patent: Sep. 10, 1985

[54] RESOURCE GRANTING PROCESS AND DEVICE IN A SYSTEM COMPRISING AUTONOMOUS DATA PROCESSING UNITS

[75] Inventors: Jean C. Ballegeer; Duyet H. Nguyen, both of Paris, France

[73] Assignee: Thomson-CSF, Paris, France

[21] Appl. No.: 363,226

[22] Filed: Mar. 29, 1982

[30] Foreign Application Priority Data

Apr. 8, 1981 [FR] France .................... 8107036

[51] Int. Cl.³ .................................... G06F 3/00
[52] U.S. Cl. ........................................ 364/200
[58] Field of Search ... 364/200 MS File, 900 MS File; 370/85, 92

[56] References Cited

U.S. PATENT DOCUMENTS

| | | | |
|---|---|---|---|
| 3,553,656 | 1/1971 | Bernhardt | 364/200 |
| 4,177,450 | 12/1979 | Sarrand | 340/825.05 X |
| 4,209,838 | 6/1980 | Alcorn, Jr. et al. | 364/200 |
| 4,257,095 | 3/1981 | Nadir | 364/200 |
| 4,281,381 | 7/1981 | Ahuja et al. | 364/200 |
| 4,320,502 | 3/1982 | DeVeer | 370/85 |
| 4,373,183 | 2/1983 | Means et al. | 364/200 |
| 4,375,639 | 3/1983 | Johnson, Jr. | 364/200 |

FOREIGN PATENT DOCUMENTS 2376464 12/1976 France .
1217355 12/1970 United Kingdom .

OTHER PUBLICATIONS

"One-Step Programmable Arbiters for Multiprocessors", *Computer Design*, vol. 17, No. 1, Apr. 1978, pp. 154-158.
*IBM Tech. Discl. Bull.*, "Asynchronous Contention Resolution", C. F. Bantz et al., vol. 23, No. 7A, Dec. 1980, pp. 3043-3044.
*IBM Tech. Discl. Bull.*, "Look-Ahead Access Request Circuit for Computer Systems", A. Blum, vol. 22, No. 3, Aug. 1979, pp. 1059-1060.

*Primary Examiner*—James D. Thomas
*Assistant Examiner*—William G. Niessen
*Attorney, Agent, or Firm*—Cushman, Darby & Cushman

[57] ABSTRACT

A process and an apparatus for the granting of a resource in a system comprising at least two antonomous data processing units in which each unit can request the granting of the resource by means of an individual interface circuit. The interface circuits are coupled to a multiple conductor channel of the binary type which can assume first and second logic states. Each unit is also associated with a particular number and a priority level. For allocating the resource to one of the units, a sequence of three conditional control signals generated in autonomous manner by the individual interface circuits is used, namely a first signal, whose positioning in the second logic state indicates that at least one unit is requesting the granting of the resource, a second signal, whose positioning in the first logic state indicates that the resource has not been allocated to any of the units, and a third signal, whose transition from the first logic state to the second logic state simultaneously authorises the start of a competition between the requesting units, followed by the choice of only one of the said units for the granting of the resource, and inhibits the requests of other units. The reverse transition of the third signal after a predetermined period validates the chosen unit and leads to the display on the multiple conductor system of a binary word representing the number of the chosen unit, as well as allowing new requests for the resource.

18 Claims, 18 Drawing Figures

RESOURCE GRANTING PROCESS AND DEVICE IN A SYSTEM COMPRISING AUTONOMOUS DATA PROCESSING UNITS

BACKGROUND OF THE INVENTION

The present invention relates to a resource granting process in a system comprising autonomous data processing units, as well as to a device for performing this process.

Within the scope of the invention, the term "data processing unit" is to be understood in its most general sense. Systems incorporating such units can, as non-limiting examples, be automatons such as programmed digital machine tools incorporating units performing specific tasks, regulating systems such as road traffic regulating systems incorporating peripheral units and geographically remote processors or, in more conventional manner, information systems. In all these systems, there are numerous problems of interaction between the various units. Particularly when two or more units are in competition to obtain access to the same resource, this type of conflict must be resolved in an optimum manner. For information purposes, it is pointed out that in an information system having several processors, a central data base can be an example of such a resource which is available to several autonomous processors.

Thus, in numerous applications, there is a need is to have a high-performance, flexible resource granting process and device. This process and device must satisfy numerous criteria. For example, they must permit parallel operation of specialized units or permit the joint use of units of different technologies and/or families, particularly those having asynchronous operating cycles. Another important condition to be satisfied is the harmonious adaptation of each unit to the overall workload of the system, while also taking into account the local features of each unit. The process and device must also permit a change in the configuration of the system, e.g. its expandability, without necessitating large-scale modifications.

Finally, the system must have a maximum reliability, i.e. a defective unit must not influence the operation of the other units. In particular a defective unit must not prevent access to the common resource by the operating units. In more general terms, the system must operate reliably and all interference problems must be eliminated.

Numerous resource granting processes are known and generally they incorporate procedures for allocating a priority level to the competing units. These known processes permit a granting of resources as a function of priorities which have been allocated on a fixed hierarchical basis or according to a cyclic time-based allocation, under centralized control.

In connection with the aforementioned information systems, it is standard practice to use bus-type connecting means between the units. These buses constitute particularly interesting examples of resources made available to several data processing units and for which access conflicts must be resolved by a bus management device.

For this type of application, more flexible resource granting processes have been proposed. These processes involve dynamic priority allocation procedures or procedures involving the exchange of a sequence of messages of the hand-shake type. Processes of these types are described in French Patent Application Nos. 2,179,031 and 2,376,464. Although they introduce a greater degree of decentralization in making the decision to grant a resource, these processes still require a centralized controller to ensure good performance. The central controller may either be one of the processors connected to the bus or a specialized unit known under several different names such as bus monitor or bus arbitrator.

BRIEF SUMMARY OF THE INVENTION

The object of the present invention is to satisfy the requirements indicated above, while eliminating the disadvantages of the prior art by entirely decentralizing the making of decisions regarding the granting of a resource. In addition, the process of the present invention makes it possible to minimize time losses at the instant of the initial allocation of a resource or at the change of assignment of said resource.

The present invention therefore relates to a process and a device for the granting of a resource in a system comprising at least two autonomous data processing units. Each unit can request the granting of the resource by means of an individual interface circuit, the interface circuits are coupled to multiple-conductor channels of the binary type which can assume first and second logic states. These multiple-conductor chananels can be wires whose potentials are placed in a high or low logic state to display various messages on the channels. Each unit is assigned a particular identification number and a priority level. For allocating the resource to one of the units, a sequence of three conditional control signals is used, one signal on each wire. These signals are generated in an autonomous manner by the individual interface circuits. When the first signal is positioned in the second logic state, that indicates that at least one unit is requesting the granting of the resource. This signal can be generated by the interface circuit associated with any requesting unit. A second signal, when positioned in the first logic state; indicates that the resource has not been allocated to any of the units. Thus signal can be positioned in the second logical state by the interface circuit associated with the unit to which the resource is allocated. A third signal, when transitioned from the first logic state to the second logic state simultaneously authorizes the start of a competition between the requesting units, followed by the choice of only one of the said units for the granting of the resource, and inhibits the requests of other units. After a predetermined period of time, the transition is reversed and this validates the chosen unit and leads to the display on the multiple conductor channel of a binary word representing the number of the chosen unit. At the same time, a new competition for the resource can be started. The transition of the third signal from the first logic state to the second logic state is brought about by at least one interface circuit which has detected that there is more than one request for the resource. This process begins with the generation of the first signal by each of the interface circuits associated with the units requesting the granting of the resource. Said interface circuits generate and display on the multiple conductor channel a binary word representing the priority level associated with the unit. The resource is allocated to the unit having the highest priority at that moment.

The invention also relates to a device for performing this process.

BRIEF DESCRIPTION OF THE DRAWINGS

The invention is described in greater detail hereinafter, relative to non-limiting embodiments, with the aid of the attached drawings which show.

DETAILED DESCRIPTION OF THE PREFERRED EMBODIMENTS

The process according to the invention will now be described in general terms relative to FIGS. 1 and 2 and the diagram of FIG. 11.

Figure 1:
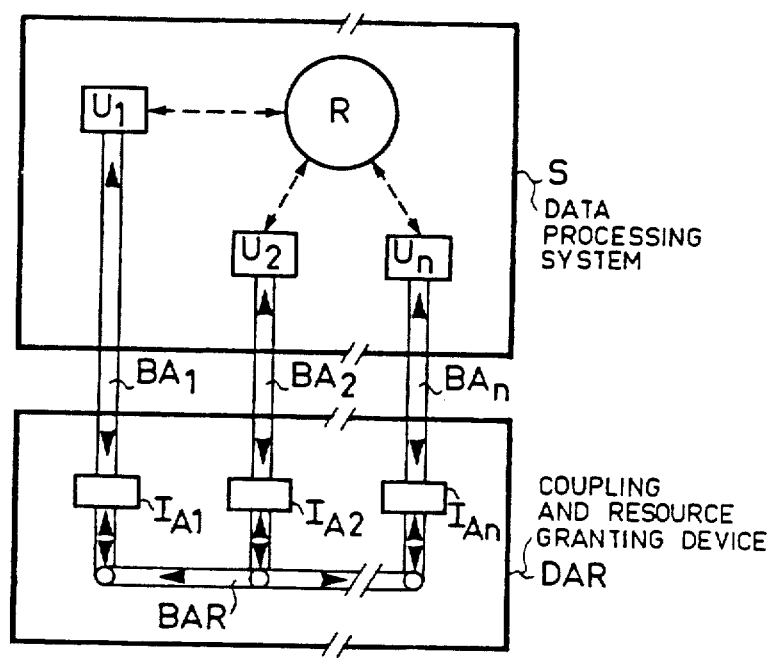
FIG. 1, a schematic representation of a resource granting device according to the present invention.

FIG. 1 diagrammatically shows a system S comprising several autonomous data processing units $U_1$ to $U_n$. As stated hereinbefore, these units can be of any random type. For explanatory purposes, an information system S will be described hereinafter, which comprises at least one data processor and peripheral units, without this explanation limiting the scope of the invention.

FIG. 1 also shows a resource R which can, for example, be a data memory to which one or more of the units $U_1$ to $U_n$ of system S wish to have access.

To resolve access conflict problems, the invention proposes a resource granting device DAR comprising interface circuits $I_{A1}$ to $I_{An}$ and a multiple conductor channel BAR for coupling between the bus-type interface circuits. Units $U_1$ to $U_n$ of system S are coupled by a particular bus $B_{A1}$ to $B_{An}$, each to an interface circuit associated therewith and which will be called hereinafter "interface" for short.

According to one of the features of the invention, all the interface circuits $I_{A1}$ to $I_{An}$ are identical and the resource granting process permits a complete decentralization of the grant decisions.

For the resource granting process, three fundamental signals are used. A first signal indicates that there is at least one unit requesting the use of a particular resource R of system S. This signal will hereinafter be called NDEMA. A second signal indicates that the resource is not under the control of any unit and the signal is called PERSO. A third signal, NCOUR, of a predetermined duration starts the procedure of allocating the resource to one of the units, called the winning unit and "freezes" all other requests during this predetermined time. Preferably, these signals are of the binary type and can therefore assume the two logic states 0 or 1.

In addition, a number or address and a priority level is allocated to each unit. This allocation can take place by any prior art procedure and preferably by a dynamic procedure.

The procedure of taking over the management of a resource is broken down into two subprocedures, namely arbitration between several units which are candidates for this management and the transfer of said management from one unit to another after a period of inactivity of the unit which held the management.

According to a preferred variant of the invention, the assignment of priority levels takes place in accordance with a priority scheme involving a dynamic assignment of these levels. This assignment can take place with the aid of data recorded in a memory and preferably in a non-volatile memory of the PROM type. The priority level is calculated by means of the difference between the priority numbers of the active unit and the unit requesting management of the resource.

The resource is allocated to the winning unit as a result of a "run" between the competing units, during which the winning unit has displayed the highest priority.

The run is started as soon as the three following conditions are brought together:

active NDEMA (low level or logic 0) indicating that at least one unit $U_i$ requests the control of resources R, active PERSO (high level or logic 1) indicating that the resource R is not under the control of any unit, inactive NCOUR (high level) indicating that no run is taking place.

The index i is an integer between 1 and n, n representing the number of units which can have access to a resource R of system S.

Figure 11:
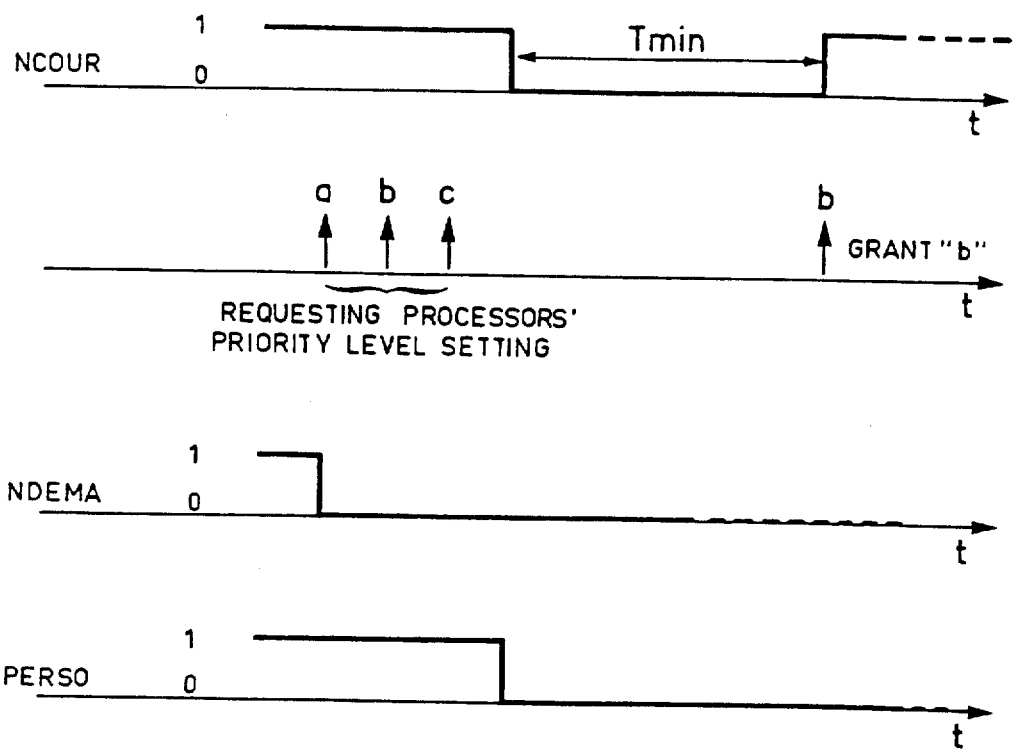
FIGS. 11 to 18 are timing and flowchart diagrams illustrating the operation of the device according to the present invention.

The diagram of FIG. 11 illustrates the case where three data processors a, b and c wish to take over the management of the same resource R.

The start of the run is triggered by the transition of the NCOUR signal, as indicated in the first line of the diagram of FIG. 11 from 1 to 0, caused simultaneously by the interfaces which first detected the request for the resource. For each unit, a new relative priority has been calculated before the transition of the NCOUR signal. This relative priority is indicated by the units a, b and c displaying on one of the multi-conductor channels a binary word which corresponds to the assigned priority of that unit. Following the necessary signal transmission time, the resource is allocated to the unit which indicated the highest priority. This also has the effect of bringing the PERSO signal to the low level (logic 0), indicating that the resource is under the control of the winning unit, and also prevents any new run.

Within the framework of an information system, each data processing unit $U_n$ has its own basic working cycle. When the units are of different technologies and/or families, these cycle times differ from one another. These times are defined by an internal clock or by timing signals derived from a centralized clock.

After a time $T_{min}$ determined by the slowest one of the clocks of the units which initialized the run, the NCOUR signal returns to logic 1 and the winning unit b displays its identification number on one of the multi-conductor channels which indicates the start of use of the resource by this unit.

Figure 2:
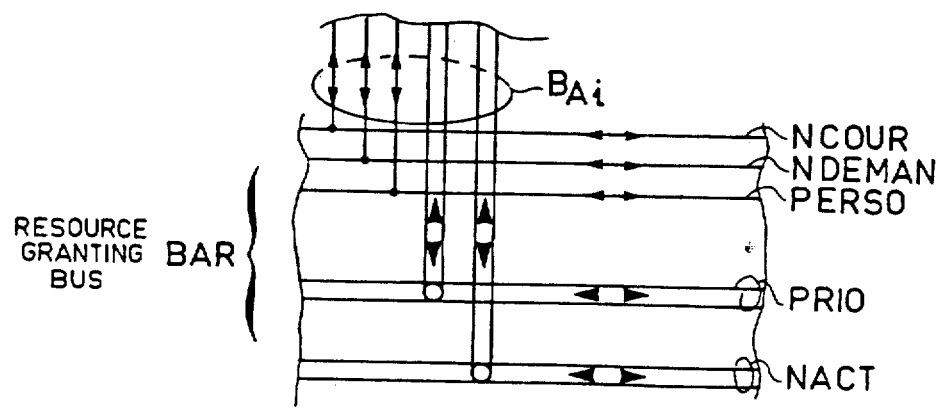
FIG. 2, is a close-up view of one of the members of FIG. 1

FIG. 2 shows in a more detailed manner, the bus BAR connecting the interface circuits $I_{A1}$ to $I_{An}$. It comprises three bidirectional connecting wires conveying signals NCOUR, NDEMA and PERSO. By convention, when N is the first letter in the abbreviations indicating the signals, it means that these signals are active in the logic 0 or low state. It is also pointed out that these signals and their meanings are given in Table 1 at the end of the present description.

Bus BAR also comprises a multiple bidirectional conductor channel PRIO conveying a binary word displaying the highest priority level calculated by interfaces $I_{A1}$ to $I_{An}$. In a particular embodiment, this channel can comprise 8 connecting wires, each conveying one bit, the priority word consisting of an octet.

The bus BAR also comprises a multiple bidirectional connection channel NACT having, for example, four wires for conveying a four-bit binary word representing the number of the victorious processor (b in the chosen example) or more generally the winning unit $U_i$.

Hereinbefore, a description has been given of the process of the invention in its main variant. The process of the invention can be further improved by two special measures, which will now be described and which namely consist of the anticipated starting of the run, i.e. anticipation of the NCOUR signal and the anticipated activation of said run.

With regards to the anticipated commencement of the run, starting with a state of the system where resource R is not active, i.e. has not been allocated, the procedure for taking over the control of this resource described hereinbefore does not make it possible to know the exact instance of the start and finish of a run. At the most, each candidate unit known at what instant it will itself initialize the run if it wins. Moveover, as soon as one run is ended, it becomes possible for a new unit to be immediately validated. Thus, an active unit which wishes to give up the resource must not authorize a new run, while removing the PERSO signal, until its final cycle is at an end. Otherwise, if it is a candidate and wins the new run, it will have needlessly waited for a cycle before taking up the resource which it has just given up. Moreover, if operation at the resource is such that each unit is active for a constant predetermined time, there is a time loss due to the choice of the next victor in the new run. These inactivity times are unacceptable. It is desirable to be able to start a run in parallel with the final cycle of the active unit and in such a way that this run ends at the same time as said cycle. For this purpose, the active unit only starts the new run if during its last cycle it has detected the presence of a request for the granting of the resource R. It is merely necessary for the unit to test NDEMA without removing the PERSO signal. If no request is indicated, before the leading edge of the unit's clock pulse on its last cycle the unit changes the PERSO signal to a1 at the end of the cycle to give up resource R. Thus, by releasing resource R without having initialized a new run, the final active unit leaves its active number on the NACT channel, which continues to serve for the calculation of a new distribution of priorities for the next run.

With regards to the second measure (the anticipated activation of the run), the anticipated start of NCOUR the run results from the need to satisfying as rapidly as possible a request for a resource, i.e. a request for starting a run, if the request is made sufficiently early. It is also desirable that the validation of a winning unit take place as early as possible. There is in fact a risk of a time loss due to the wait for the end of the run for the resynchronization of the victor on its particular clock.

Whenever possible, an effort is therefore made to validate or enable the winning unit without waiting for the end of the run. In the case where the final active unit again makes a request, it can, as soon as its run is ended, pass into the active mode again if it is victorious. Due to the fact that there is only one winning unit on each occasion, the anticipated validation does not impair the satisfactory operation of the system.

If the winning unit is the only requester in system S, it only requires one clock cycle for taking up the resource again after a period of inactivity.

As has been stated, the process of the present invention permits the arbitration between units requesting a resource and the granting of this resource to one of the autonomous processing units of a system S, no matter what the nature of the said system. In a preferred approach, the system is an information system comprising different units, namely peripheral units and/or processors, all connected to a bus-type data exchange channel. In this case, the channel itself constitutes a particularly interesting example of a resource to be allocated for which the units are in competition, FIGS. 3 and 4 diagrammatically illustrate such a system.

Figure 3:
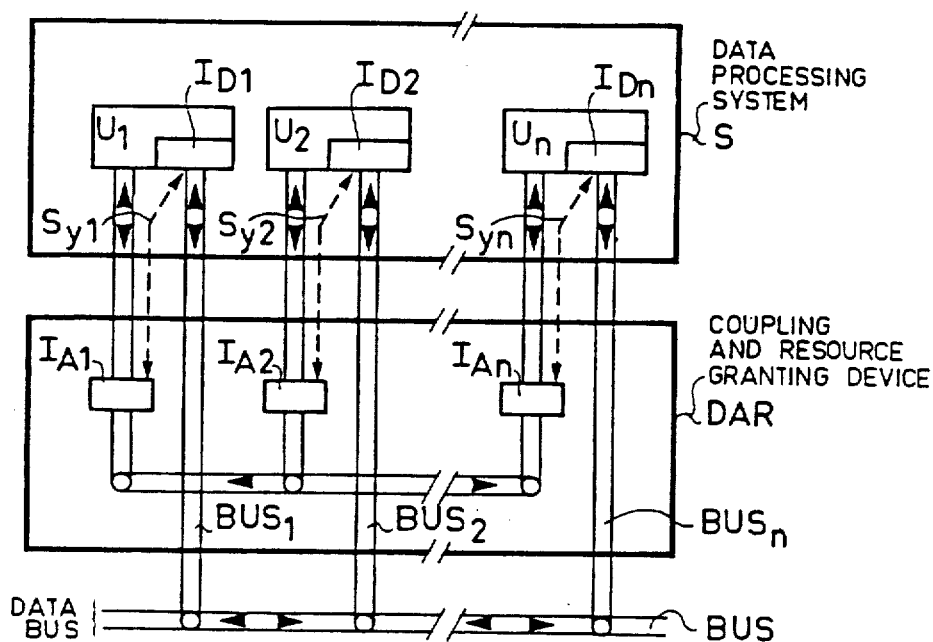
FIG. 3, a variant of the device from FIG. 1 in which the allocated resource is a bus-type data exchange channel.
Figure 4:
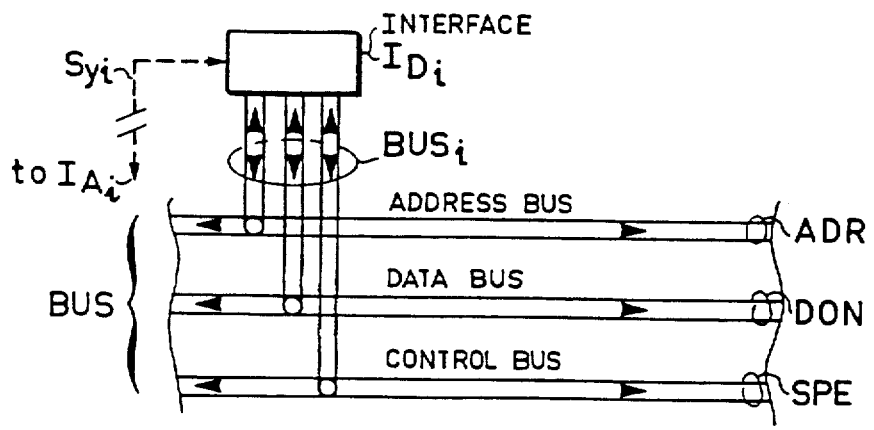
FIG. 4, a close-up view of the data exchange channel of FIG. 3.

In addition to the previously described resource granting device DAR, system S incorporates a connecting channel BUS for data BUS, said exchange being also of the bidirectional type in the embodiment described relative to FIG. 3. In conventional manner, the channel BUS can comprise, in the manner illustrated in FIG. 4, a bus conveying address words ADR, e.g. words having 32 bits, a bus conveying data words DON, e.g. words having also 32 bits dividable into octets and a bus conveying service signals SPE. The latter generally comprise signals permitting the reliable exchanges, such as enable and acquittal signals, as well as synchronization clock signals. This bus may also incorporate multiple connections and connections conveying the voltages necessary for the operation of the different units connected thereto. The precise architecture of the connection channel BUS falls outside the scope of the present invention.

Units $U_1$ to $U_n$ forming the system can communicate with the channel BUS by means of special buses $BUS_1$ to $BUS_n$, via interface circuits $I_{D1}$ to $I_{Dn}$. The function of these circuits, $I_{D1}$ to $I_{Dn}$, permit the connection of the units $U_i$ to $U_n$ to the BUS channel. These interface circuits, $I_{D1}$ to $I_{Dn}$ also fall outside the scope of the present invention. It may also be necessary to bring about synchronization between the resource granting interface circuits $I_{Ai}$ and the data exchange interface circuits $I_{Di}$. This synchronization is symbolized by the connections $S_{y1}$ to $S_{yn}$, which can be multiple conductor channels which carry clock signals.

Once the winning unit has been determined by the process according to the present invention, said unit takes over the management of the BUS channel and can use it for exchanging data with one or more other units, e.g. in accordance with a procedure involving addressing a particular unit followed by the actual data exchange.

To obviate monopolization of the Bus channel by a particular unit, it is possible in a centralized manner to designate a maximum time, at the end of which the resource, i.e. the BUS channel in the present case, must be placed open to a new competition and granted again in accordance with the process of the invention described hereinbefore. For this purpose, the clocks of each unit can be used in association with the designated maximum time of operation.

The resource granting interface circuits $I_{Am}$ associated with each of the competing units $U_n$ in a system S will now be described in greater detail and a practical embodiment will be given in which the resource to be granted is a BUS channel and the system S is an information system.

Figure 5:
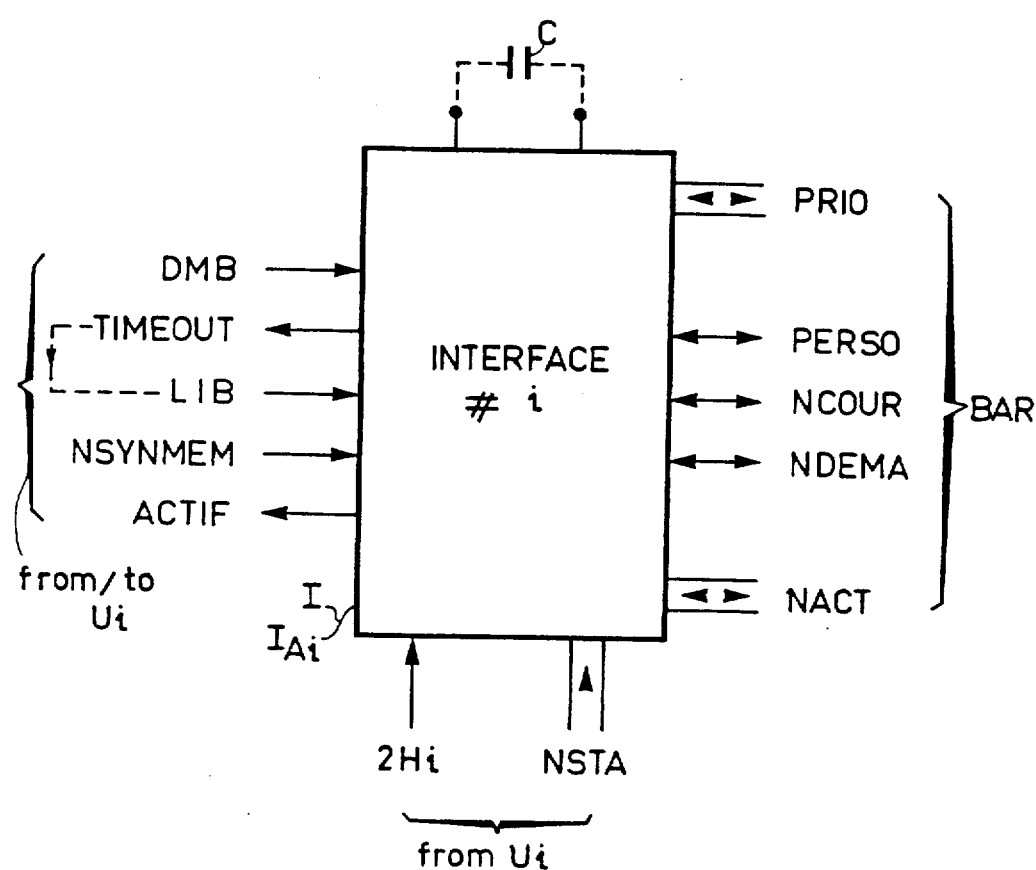
FIG. 5, a schematic representation of the interface means used in the resource granting device according to the present invention.

FIG. 5 diagrammatically depicts such an interface circuit. It is firstly assumed that each unit $U_i$ is provided with a clock having a given frequency and generating a clock signal $H_i$. This interface circuit is in the form of a module $I_{Ai}$, which is interconnected between bus BAR and the associated unit $U_i$. The module receives clock signals $2H_i$, whose frequency is double that of unit $U_i$, said clock signals being synchronized relative to one another. It is this clock period which determines the minimum time of the run initialized by the interface circuit $I_{Ai}$. The period must be equal to or exceed a minimum time for ensuring a satisfactory operation of the unit $U_i$, said time being dependent on the technology used. Five signals are required for connecting the interface circuit to the associated unit. Interface $I_{Ai}$ is notified that unit $U_i$ is requesting the connecting channel BUS by signal DMB.

When unit $U_i$ is selected, interface $I_{Ai}$ returns the ACTIF signal to the unit, indicating that the BUS channel is available and that data transfer can commence. A NSYNMEM signal makes it possible to synchronize interface $I_{Ai}$ with the BUS channel interface $I_{Di}$, which is also associated with unit $U_i$, as has been described in connection with FIGS. 3 and 4. This signal is one of the signals conveyed by the synchronization connections $S_{yi}$ shown in the same drawing. The NSYNMEM signal shown in the bottom line of the diagram of FIG. 12, which is active at logic 0 or low level in accordance with the convention referred to hereinbefore, is a periodic or cyclic signal of duration T at the active level, said duration being equal to the time necessary for a data transfer operation on the BUS channel. This signal only interferes with the operation of interface $I_{Ai}$ at the time of the final data transfer.

When unit $U_i$ frees the BUS channel, the unit can indicate when the final transfer is to take place. For this purpose, it is merely necessary that the unit drops signal DMB, while signal NSYNMEM is still active. This is shown in part A of the diagram of FIG. 12.

Figure 12:
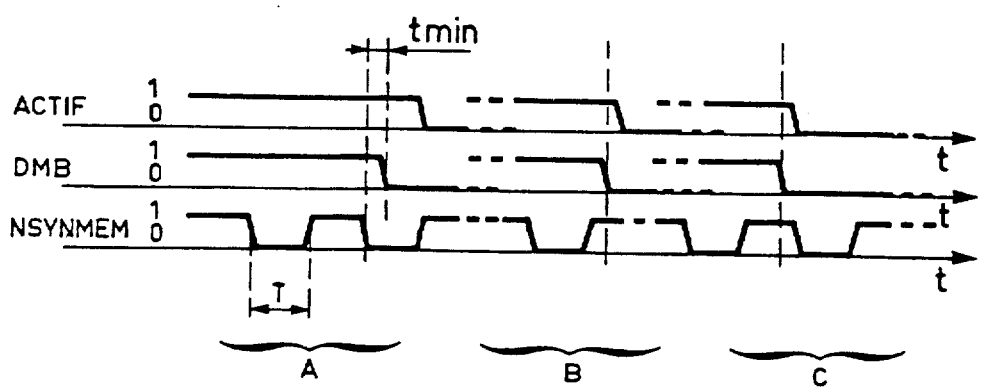

If DMB drops when NSYNMEM is inactive, interface $I_{Ai}$ considers that there will be no further data transfer and this is shown in part B of the diagram of FIG. 12.

This condition makes it possible to carry out the aforementioned anticipated start of the run and whose detailed performance will be described in greater detail hereinafter. To improve the performance characteristics of the system S, it is preferable to use this arrangement, in which case it is necessary to ensure that signal DMB is correctly linked with signal NSYNMEM.

In the general case, it is the acting unit $U_i$ which is responsible for the determination of the final data transfer and this determination falls outside the scope of the present invention.

Part C of the diagram of FIG. 12 represents the case where a defective operation has appeared, namely the active signal has dropped before the final transfer has taken place.

A TIMEOUT signal regulates the maximum time associated with unit $U_i$ for the management of the BUS channel. This time can be determined by means of a capacitor C having a given value and acting on a monostable multivibrator in the manner to be described hereinafter. However, any other method can be used, e.g a purely digital method using binary counters having a modifiable capacity or associated with a logic for the selection of a particular time.

The TIMEOUT signal makes it possible to limit the access to the BUS channel. It is possible to define two fundamental use modes. In the first mode, the time defined by the TIMEOUT signal has a low value, e.g. a few microseconds. Therefore, unit $U_i$ can perform one or two data transfers on the BUS channel and then release the BUS channel as soon as another requester appears. In this case, each unit $U_i$ has frequent access to the bus channel, but for a short time. In the second mode, the time defined by the TIMEOUT signal is fixed in such a way that it is of the same order of magnitude as the mean duration of the accesses to the BUS channel by unit $U_i$. In this case, unit $U_i$ performs in sequence an activity on the BUS channel.

In response to the TIMEOUT signal, the unit $U_i$ returns a LIB signal, which frees the interface $I_{Ai}$. Finally, the interface receives a binary word representing the number allocated to unit $U_i$ on channel NSTA.

Figure 6:
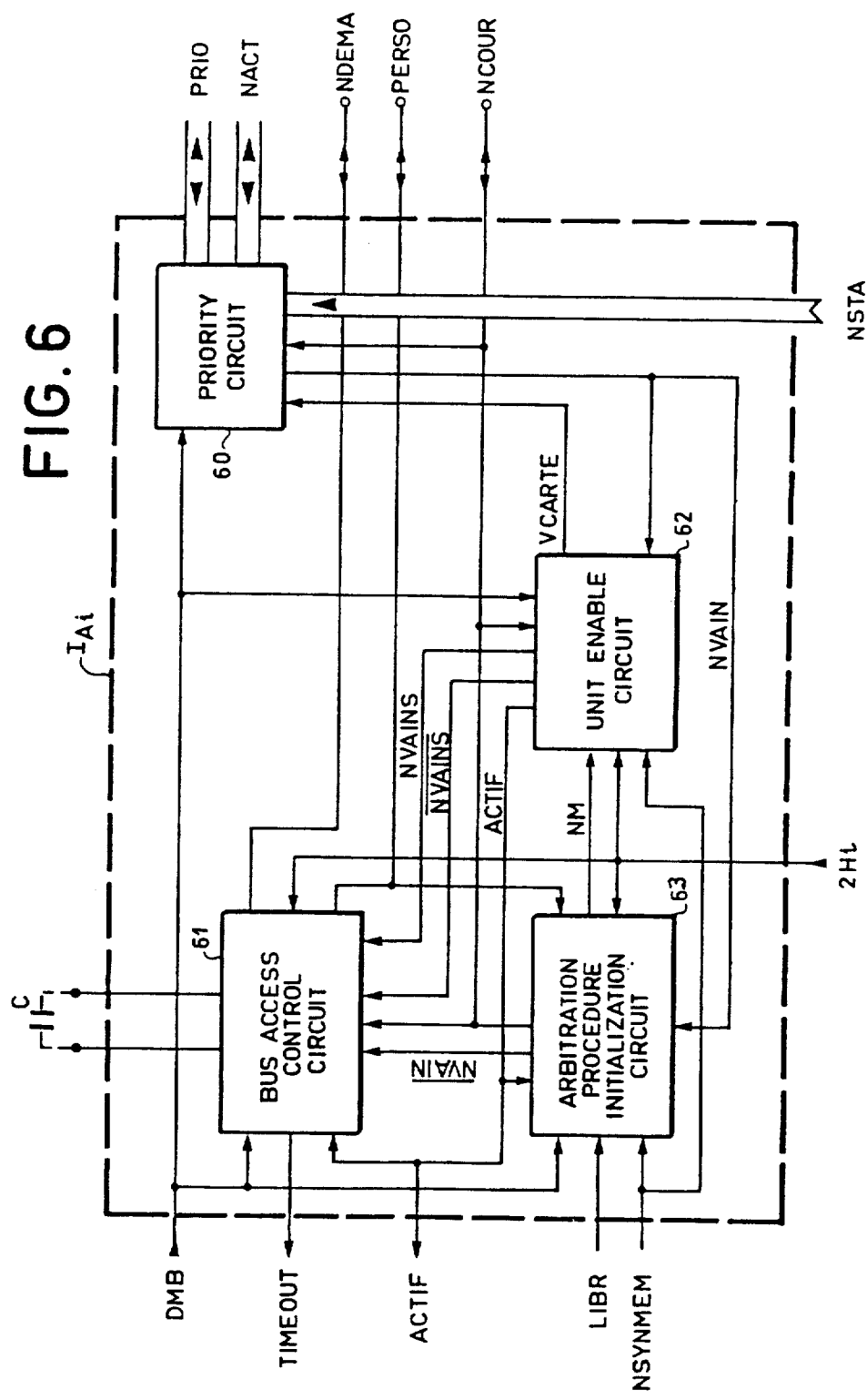
FIGS. 6 to 10 depict a practical embodiment of the circuits contained within the interface means of FIG. 5.

Interface $I_{Ai}$ can be broken down into four separate circuits interconnected for performing the grant function in the manner illustrated in FIG. 6.

In succession, the following occur:

a priority selection circuit 60 containing the priority-determining logic transmits a signal indicating that the circuit considers that it has the highest priority code on the BUS channel; NVAIN an initialization circuit 61 for initilizes the run on the basis of external data, requests for the BUS channel, winning unit $U_i$, NVAIN, etc and the logic associated with said circuit 61 determines whether the run can be initialized and controlled by the same circuit when anticipation occurs. Circuit 61 transmits two main signals, namely the aforementioned NCOUR and NM, which indicates that it is unit $U_i$ which is managing the run, the activation circuit 62, whose essential function is to notify unit $U_i$ that its request is approved ceases operation when the request disappears in accordance with the conditions defined hereinbefore. The logic associated with circuit 62 returns the VCARTE signal to the priority selection circuit 60 enabling the unit $U_i$ to display its unit on the NACT bus and thus indicate the victorious number, the bus access control circuit 63 controls the use of the BUS channel. This part of the interface $I_{Ai}$ is a decision circuit controlling the actions to be carried out on the BUS channel and on the bus BAR. This circuit signals a request to participate in a possible run. It also controls the PERSO signal and the TIMEOUT signal.

The detailed operation of these different circuits will now be described and specific embodiments given. For information, the technology chosen can be a highspeed Schottky technology.

Hereinafter, logic gates are used for forming the logic function AND and/or NAND and NOR in their generally accepted meanings and there is no need to describe these in great detail. Inverters are also used and their function is to supply the logic complement of a binary signal present at their input. By convention, the high level is the logic 1, represented in the chosen technology by a voltage of +5 V, whereas the low level is logic 0, represented by a 0 voltage.

Type D flip-flops are also used and their configuration will now be described in greater detail. A full description of a Type D flip-flop, as well as the truth table and timing chart for such a flip-flop appear, among other publications, in the French book "DE LA LOGIQUE CABLEE AUX MICROPROCESSEURS" by BERNARD et al, Vol. 1, Chapter X4, pp. 136-138 (Editions EYROLLES; PARIS 1979).

Such a flip-flop has a data input D, a clock input H, a presetting input Pr (preset), a clearance input Cl (clear) and two outputs; true Q and reverse $\overline{Q}$. Inputs Pr and Cl are asynchronous and reset the flip-flop to 1 or 0 respectively, independently of the clock signals. The synchronous mode is defined by the data input D and the clock input H. The flip-flop "records" inputs D as soon as a rising front of the clock signal applied to input H appears, taking account of a signal transition delay of a few nanoseconds in the chosen technology.

It should be noted that logic circuits, whose outputs are connected in parallel on lines constituting the bus BAR are of the so-called "open collector" type. Thus, it is necessary that the low logic level preponderates over the high logic level.

Finally, only the logic functions essential for the understanding of the invention will be described and are shown in FIGS. 7 to 10. Auxiliary circuits, such as power supply distribution circuits are not shown. The logic elements necessary for constructing the circuits can be chosen from the commercially available integrated circuits.

Figure 7:
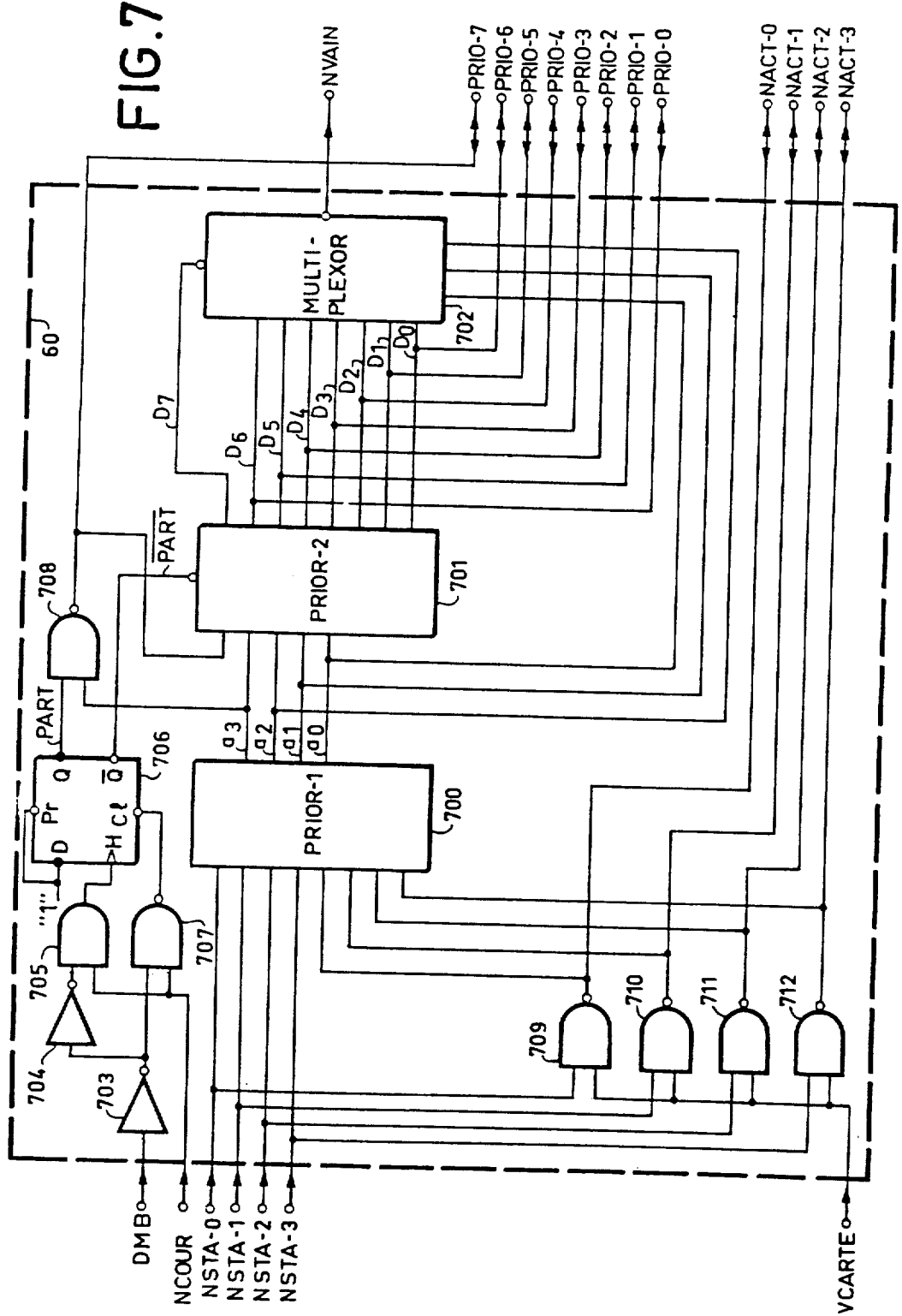

FIG. 7 is a schematic diagram of the priority circuit 60. As shown in FIG. 7, the priority selection function can be represented in symbolic form by a circuit which receives and transmits the NVAIN signal. This signal is internal to interface $I_{Ai}$ and indicates that the requesting unit considers that it has the highest priority after analysis of its priority by signals conveyed on the PRIO bus (0 to 7).

These priority signals are received and optionally retransmitted after modification. The same applies with regards to the signals representing the number of the active unit NACT (0 to 3). For the processing of these signals, priority circuit 60 receives NSTA signals (0 to 3), representing the number allocated to unit $U_i$, and signals DMB and VCARTE processed by unit $U_i$ for the other circuits of interface $I_{Ai}$ which will be described hereinafter.

Figure 13:
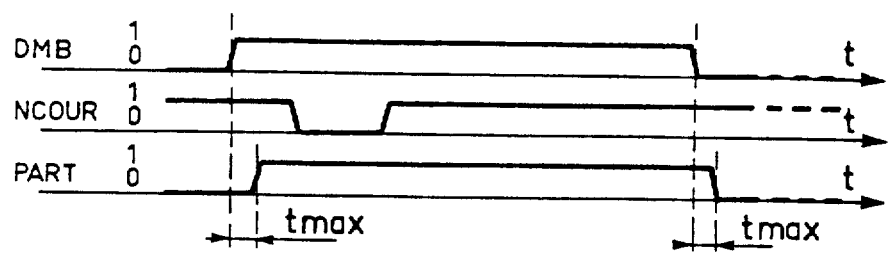

To claim the management of the BUS channel, a unit $U_i$ must participate in a run which ends with the determination of a victor. Participation is represented by the PART signal and is activated when a request of unit $U_i$ is made when the run has still not commenced: high level NCOUR signal. The participation signal is activated throughout the time the unit is requesting the BUS channel: high level DMB. This operation is illustrated in the diagram of FIG. 13. The calculation of the relative priorities is then performed by the priority circuit 60.

Prority circuit 60 functions continuously and comprises a PRIOR-1 memory 700 of the PROM type, which fixes the priority on the basis of the identification number of the processor (static number) given by the NSTA bus (NSTA-0 to NSTA-3) and the number of the last processor present on the bus channel (active number given by the NACT bus) (NACT-0 to NACT-3). Memory 700 supplies a four-bit code ($a_0$–$a_3$), which fixes the relative priority of the unit at a time t. This priority is a function of the difference between NACT and NSTA. The input circuits of memory 700 corresponding to the bits of the NACT bus comprise inverters.

The length of the binary words conveyed by the NACT and NSTA buses is given for information purposes and in no way limits the scope of the present invention. The NSTA number can be supplied by wired logic and can be permanently allocated to unit $U_i$. With four bits, 16 units can be connected to the bus channel.

An example of the content of the PRIOR-1 memory 700 is given by table II at the end of the present description. The output signals are indicated by symbols $a_0$ to $a_3$. The table shows the priority algorithm. The content of the memory does not have to be standard and can thus satisfy special applications.

A fixed priority operation can be obtained or priorities can be allocated by groups of units rather than individual units. In this case, the priorities of the units in each group are relative within the group, but the groups have a fixed priority.

During the initialization of the system, the unit to which the number NSTA=0000 has been allocated fictitiously assumes the control of the BUS channel and transmits the number 1111 to the NACT channel. It therefore has the lowest priority when the PERSO signal is active (high level).

The priority code from memory 700 ($a_0$ to $a_3$ allocated at a time t) is used for addressing a PRIOR-2 memory 701, which is also of the PROM type and which is selected when the unit is participating in the run, level 0 corresponding to the lowest priority. The procedure is as follows: Each unit able to participate in the run signals a 0 on lines 0 to 7 of the PRIO bus to inhibit the requests of the other unit of lower priority level. Therefore, the unit wins if its priority level is not inhibited by another unit.

The highest priority unit $U_i$ activates the NVAIN signal indicating that it has the highest priority. NVAIN evolves in time as a function of requests and stabilizes during the run (interval T of the NCOUR signal in FIG. 12). The NVAIN signal is produced by a multiplexer 702 receiving at its inputs, the outputs of the PRIOR-2 memory 701, which correspond respectively to bits 0 to 6 of the binary word conveyed by the corresponding connections of the PRIO bus (as well as to the respective outputs $D_7$ to $D_1$ of memory 701). In the considered embodiment, the addressing of the multiplexer for making the choice between the inputs takes place by a three-bit binary word constituted by outputs $a_0$ to $a_2$ of the PRIOR-1 memory 700.

An example of the content of memory PRIOR-2 701 is given in table III at the end of the description. The outputs $D_7$ to $D_1$ correspond respectively to the bits conveyed by connections PRIOR-0 to PRIOR-6, output $D_0$ activating the multiplexer 702 (authorization input S). The addressing of the PRIOR-2 memory 701 is brought about by means of a five-bit word $a_0,a_1,a_2,a_3$ and PRIOR-7. This PRIOR-7 signal is processed on the basis of output $a_3$ of the PRIOR-1 memory 700 inverted by inverter 713 and signals DMB and NCOUR, as a function of the logic function performed by inverters 703, 704, NAND logic gates 707, 708, and AND logic gate 705 and the type-D flip-flop 706 interconnected in the manner shown in FIG. 7. The signal at the true output Q is the already described PART signal.

If the unit wins the run, priority circuit 60 receives the VCARTE signal permitting it to display its number on the NACT bus. For this purpose, four logic NAND gates 709 to 712 are activated by the VCARTE signal so as to transmit the signals present on the connections of the NSTA bus, representing the number allocated to unit $U_i$.

Figure 8:
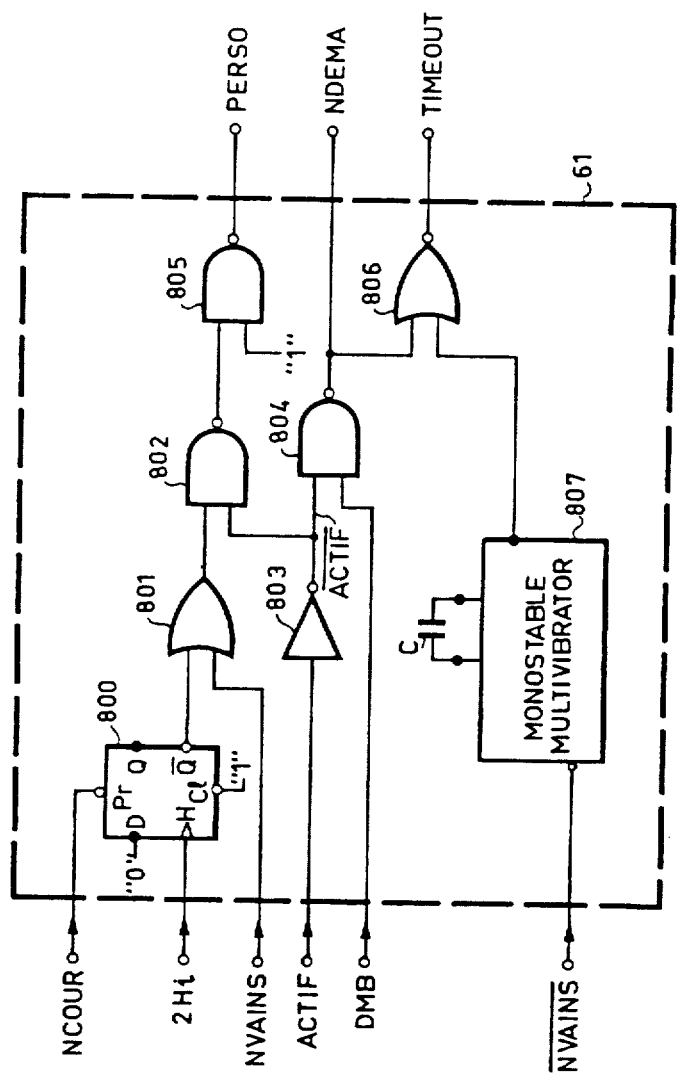

FIG. 8 describes an embodiment of bus access control circuit 61, its function being to process the already described PERSO, NDEMA and TIMEOUT signals. For this purpose, it receives signals from the other circuits of interface $I_{Ai}$ or the associated unit $U_i$ such as the NCOUR and NVAINS signals and its complement $\overline{\text{NVAINS}}$, ACTIF, DMB, as well as the clock signals $2H_i$ of double the frequency of the clock signals of unit $U_i$, as described hereinbefore.

Figure 14:
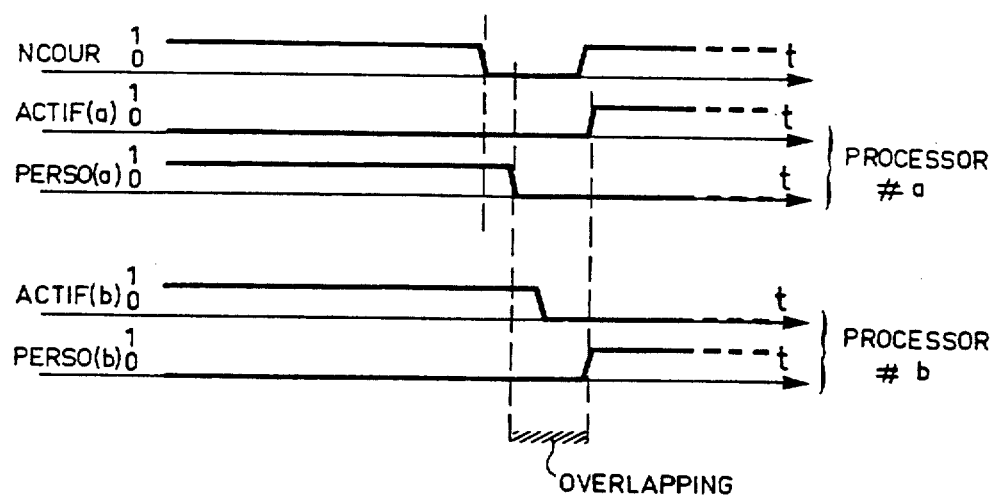

A run is started with a unit requesting it and there is necessarily a victor. Therefore, the PERSO signal is a logic 0 as from the start of a run, as indicated by the diagram of FIG. 14.

The activity of the winning unit maintains PERSO in the low state as from the end of the run. PERSO is now only under the control of the ACTIF signal which disappears as soon as the unit withdraws its request. If a unit is already active and the run anticipation function is used, each active unit controls the PERSO signal, thus permitting a contiguous transition from one unit to the next. The transition of the management of the BUS channel from one unit to the next, e.g. from processor b to processor a at the end of a run is illustrated in FIG. 14.

In FIG. 8, to obtain the BUS channel, unit $U_i$ must activate the NDEMA line, particularly if the BUS channel is occupied. This line is activated if the request is not satisfied. The active unit must withdraw its request on the bus BAR, so that account can be taken of the requests of the other units.

As soon as the unit has obtained the BUS channel bus access control circuit 61 receives an NVAIN signal, which will be described hereinafter, and a monostable multivibrator 807 is triggered. The duration of the output signal of the multivibrator is fixed by a capacitor C. The TIMEOUT time is indicated to unit $U_i$ only if another unit has made a bus request (NDEMA).

The signals described above are processed by means of the OR logic gate 801, NAND logic gates 802, 804, 805 and NOR logic gate 806 of inverter 803, the type-D flip-flop 800 and the monostable multivibrator 807 indicated in the manner shown in FIG. 8. Reference 0 and 1 represent 0 and 1 permanent logic states, i.e. in accordance with the hereinbefore accepted conventions, low and high states respectively.

Figure 9:
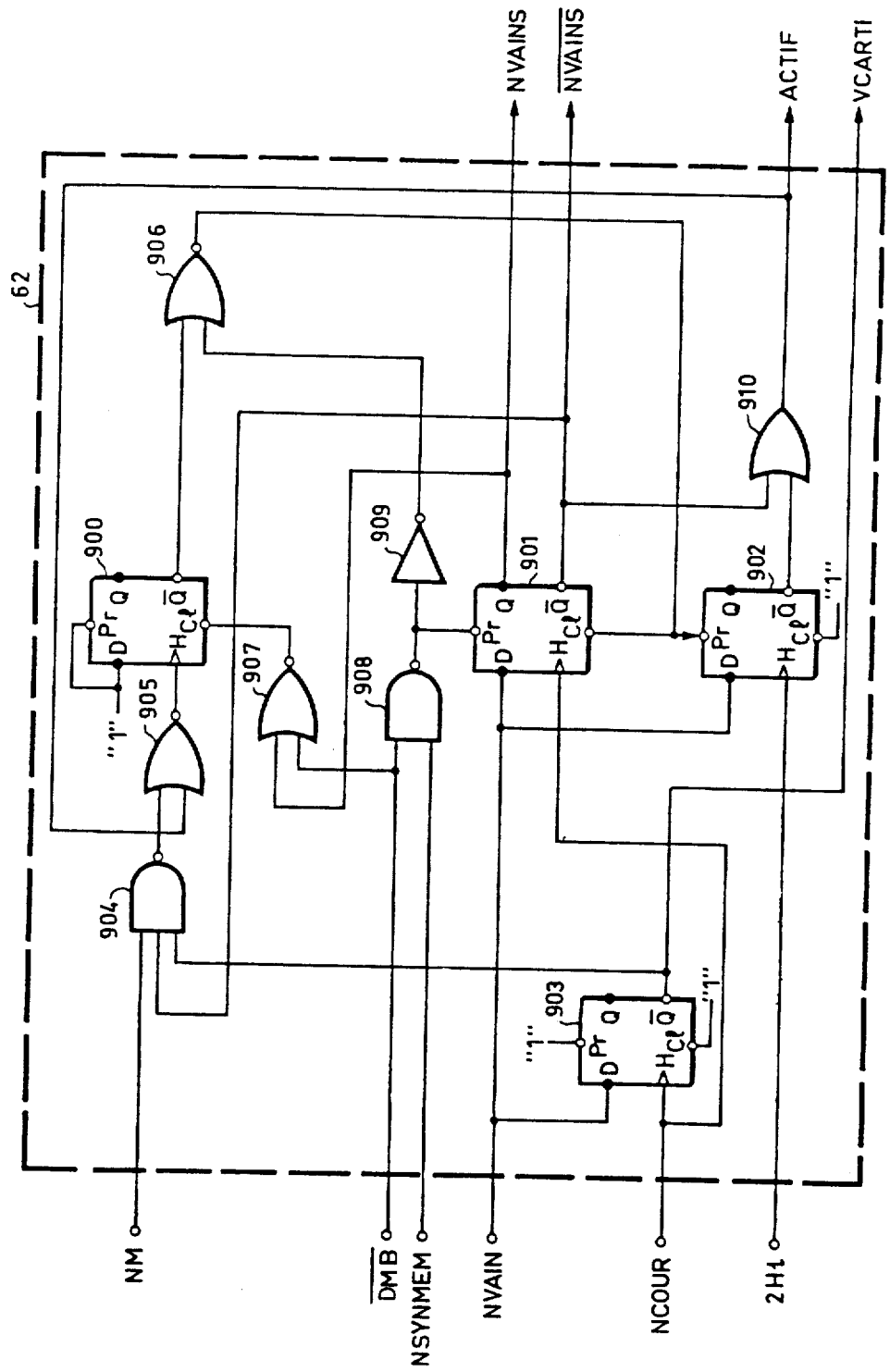

FIG. 9 shows a specific embodiment of enable circuit 62 of FIG. 6, which processes four signals, NVAINS and its complement $\overline{\text{NVAINS}}$, ACTIF and VCARTE.

The activity of unit $U_i$ is indicated by the ACTIF signal. The run must end with the selection of a unit and the display of its number on the NACT bus.

The meaning of the two other signals is as follows:
NVAINS: This signal makes it possible to store the state of the unit (victor state or not) at the end of the run (trailing edge of the NCOUR signal) and when the unit releases the BUS channel, NVAINS disappears when the conditions between the DMB and NSYNMEM signals described hereinbefore are obtained.
VCARTE: This signal is received by priority circuit 60 of FIG. 6 and authorizes interface $I_{Ai}$ to display its number if it is the victor, said signal not being restored to the low state when the unit releases the BUS channel in order to maintain active the priority calculation function.

The processing of the ACTIF signal obeys the criteria described hereinbefore.

In the general case, a unit cannot transition into the active mode except at the end of a run. However, the exception to this is anticipated activation. This procedure can only take place:

(a) If the number of unit $U_i$ is already present on the NACT bus. If this is not the case, the unit could start transfers on the BUS channel with another number. This implies that the anticipated activation can only occur when the last active unit has again been selected, (fixed priority). The VCARTE signal which indicates the state of the unit since the final run must be tested.

(b) If the unit has itself started a run, it can only be determined active if a minimum time has elapsed since the start of the run corresponding to the stabilization of the NVAINS signal. The minimum time depends on the technology used. An order of magnitude in the case of a high-speed technology is 100 ns.

If these two conditions are satisfied, the active signal is validated or enabled at the end of the run which was begun of by the unit which has been declared winner of the run.

Thus, there are two operating modes, an asynchronous mode which takes place when unit $U_i$ did not manage the previous BUS channel operation and a synchronous mode which appears if unit $U_i$ had the management of the BUS channel and started the run, in which case the unit is active at the end of the minimum time.

The type-D flip-flop 901 is reset as soon as the run is ended: validation of the NVAINS signal.

Figure 15:
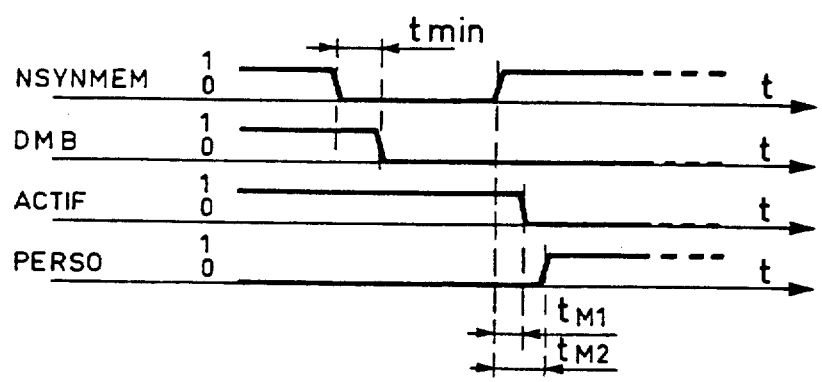

Several different operating cases will now be examined. The first case, illustrated in the diagram of FIG. 15, is that where the unit releases the BUS channel prior to the maximum time allocated to it. Signal DMB drops to the low state (signal $\overline{\text{DMB}}$ in the high state). The ACTIF signal drops at the end of the final transfer, i.e. on the rising front of the NSYNMEN signal and the PERSO signal is restored to the high state by bus access control circuit 61, taking account of the timelags necessary for transition delays $t_{min}$, $t_{M1}$, $t_{M2}$. Typical values are $t_{min} = 20$ ns, $t_{M1} = 25$ ns, and $t_{M2} = 60$ ns, within the scope of the chosen technology.

Figure 16:
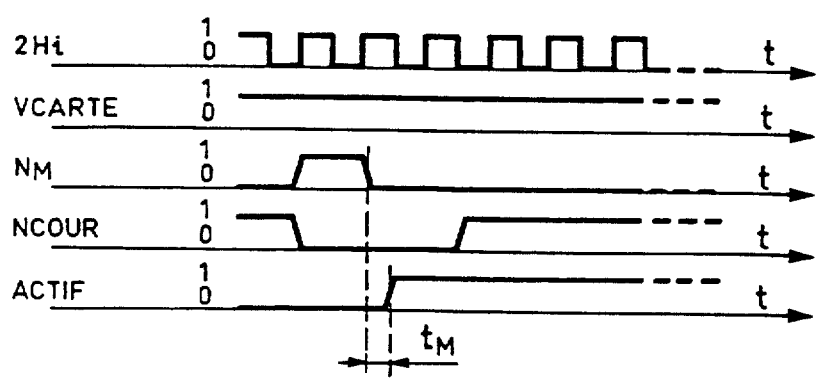

The second case is that of anticipated activation, as illustrated in FIG. 16. The VCARTE signal in the high state indicates that unit $U_i$ previously managed the BUS channel. Signal NM again passes into the high state as soon as the NCOUR signal passes into the low state, thus indicating that the unit is managing the run. This signal is processed by arbitration initialization circuit 63, to be described hereinafter relative to FIG. 10. The unit again passes to the ACTIF state (high level active signal) when the first rising front of the clock signals $2H_i$ appear, taking account of the timelag $t_M$ for transition delays, which can be approximately 20 ns. The unit then becomes active again before the end of the run (NCOUR in high state).

Figure 17:
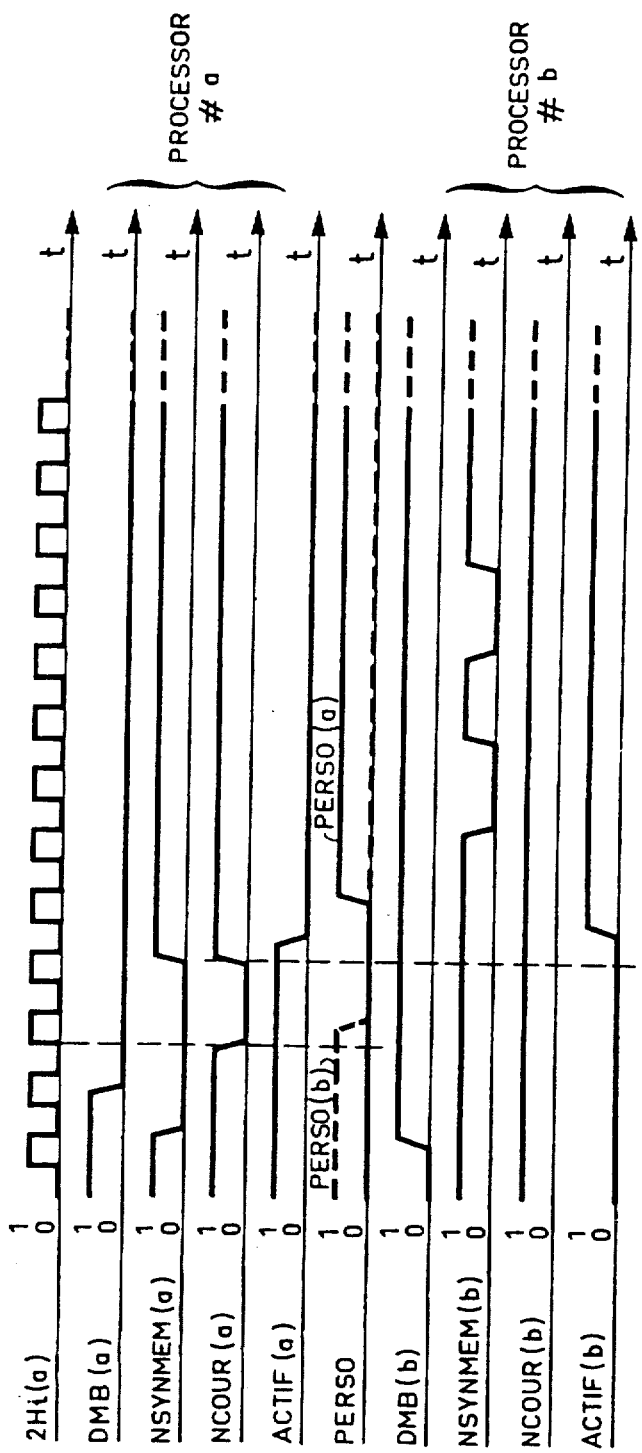

The third case is where the unit takes over the management of the BUS channel, the management previously having been held by another unit. When the anticipated run function is used, the transition from the management of one unit to another takes place in a contiguous or joining manner. This operating case is illustrated by FIG. 17. For example, the management of the BUS channel passes from processor a to processor b at the end of a run caused by the drop of the NCOUR signal. The chronology of the signals can be clearly gathered from the diagram of FIG. 17 and conforms to the procedures described hereinbefore.

The generation of the $\overline{\text{NVAINS}}$, NVAINS, ACTIF and VCARTE signals in accordance with the sequences described hereinbefore takes place on the basis of the NM, $\overline{\text{DMB}}$, NSYNMEM, NVAIN, NCOUR signals and the clock signals $2H_i$ with the aid of D-type flip-flops 900 to 903, logic NAND gates 904 and 908, logic NOR gates 905, 906 and 907, logic OR gate 910 and inverter 909, interconnected in the manner shown in FIG. 9.

Figure 10:
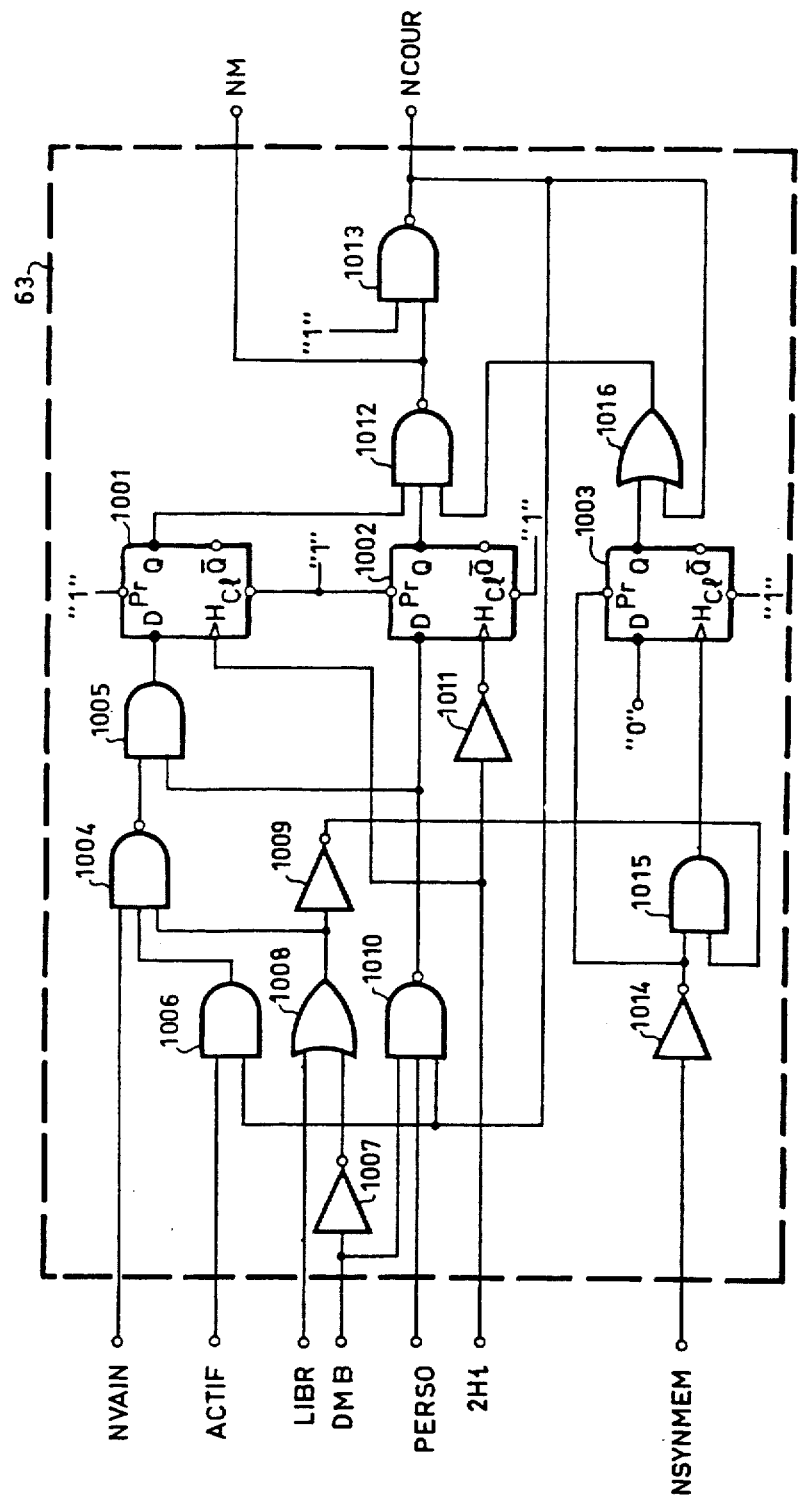

The arbitration initialization circuit 63, whereof an embodiment is illustrated by FIG. 10, essentially serves to generate the NCOUR start of run signal, as well as the NM signal. For this purpose, it receives the NDEMA, ACTIF, LIBR, DMB, PERSO and NSYNMEM signals, as well as the clock signal $2H_i$.

A run is started whenever one or more units ($U_1$ to $U_n$) wish to have access to the BUS channel and obtain the management thereof. The run makes it possible to "freeze" the requests with a view to selecting the highest priority unit.

A run is started in the following cases:

no unit occupies the BUS channel and each unit initializes its own run, a unit $U_i$ is active on the BUS channel and manages the latter, said unit initializing a run during its final transfer (NSYNMEM signal)

the active unit $U_i$ has exhausted its allocated time (TIMEOUT)

a run is started if the unit managing the BUS channel withdraws its request (identical to the previous case) or if its interface receives the release command (LIBR), in which case unit $U_i$ anticipates the new run, if it has not withdrawn its request.

The LIB and DMB signals are processed by unit $U_i$ associated with a given interface $I_{Ai}$.

The synchronization of the run takes place in the following way. When no unit has the management of the BUS channel (PERSO signal in high state), the run is synchronized on the clock signals $2H_i$ of the unit which first requests the BUS channel and lasts one clock cycle ($2H_i$). In the other cases, one unit is active and the run starts on the leading edge of the first clock signal $2H_i$ after the drop of the DMB signal. The run ends at the end of the final transfer, if a clock cycle has already elapsed. The minimum duration of a run is consequently equal to one clock cycle.

Figure 18:
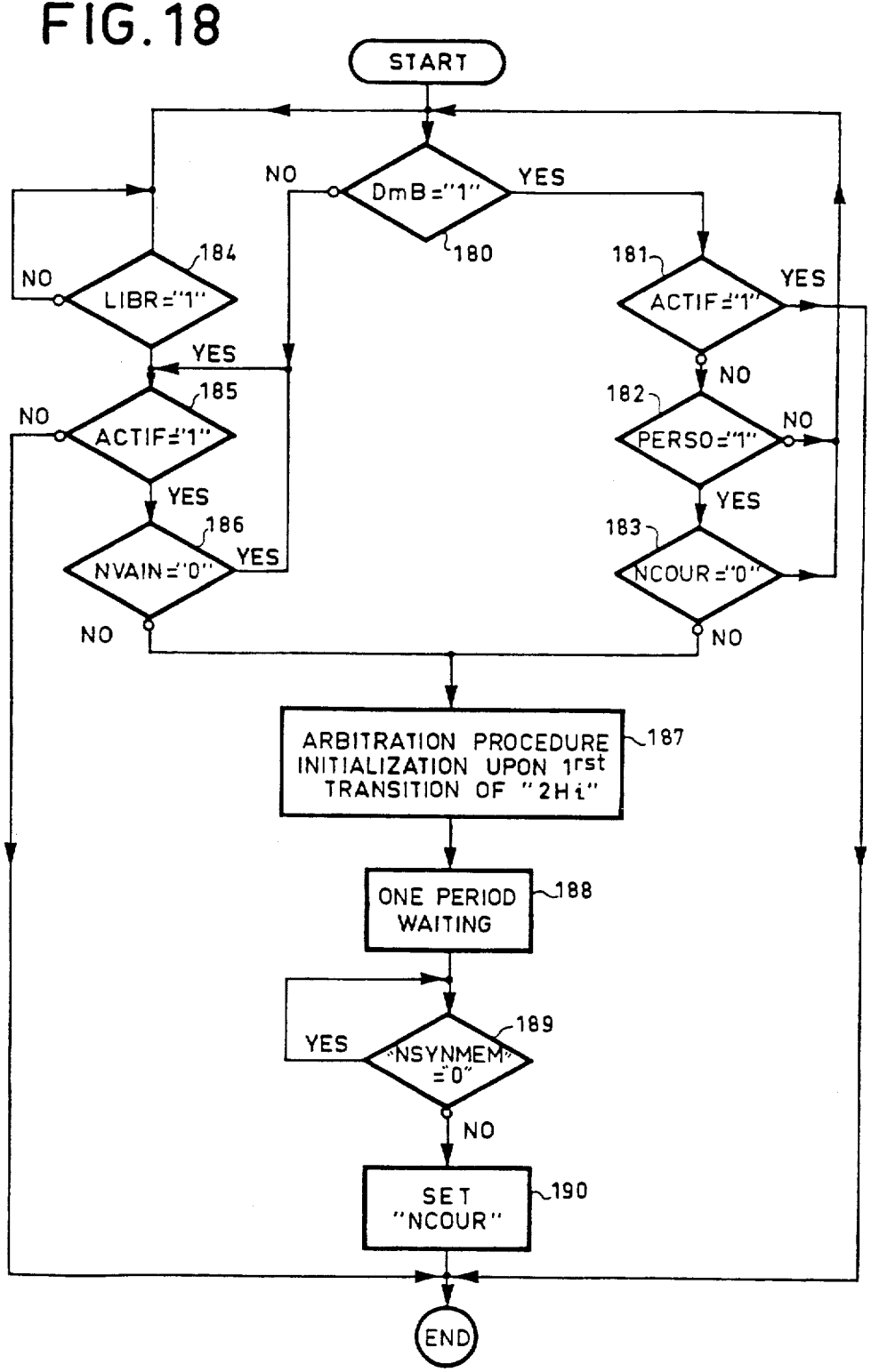

The starting of a run (drop of NCOUR signal) follows a clearly determined sequence, illustrated by the diagram of FIG. 18.

When a BUS channel management request appears (at step 180: DMB signal=1) and the unit is not active (at 181: ACTIF signal=0), the conditions for initializing a run (at 187) are as follows: no unit manages the BUS channel (at 182: PERSO signal=1) and no other run is started (at 183: NCOUR signal=1). In this case, following one period of clock signals $2H_i$ (at 188), the NCOUR signal is restored to the high state to ensure the selection of the winning unit. In this case, the NSYNMEM signal is in the high state (inactive), because no unit has been activated.

When the BUS channel management request signal drops (at 180) or the interface $I_{Ai}$ receives a release order (at 184: LIBR signal=1) and the unit is active (management of the BUS channel), a run is initialized if the NDEMA signal is active (at 186 NVAIN signal=1), i.e. a unit requests the management of the BUS channel. The rise of the NCOUR signal (at 190) takes place synchronously with the end of the final transfer (at 189: NSYNMEM signal 0, branch NO).

To bring about the conditions described hereinbefore in connection with the flow chart of FIG. 18, the NCOUR signal is processed by means of signals transmitted to arbitration initialization circuit 63 of FIG. 10. These signals are processed by type D flip-flops 1001 to 1003, the NAND gates 1004,1010,1012 and 1013, AND gates 1005,1006 and 1015, OR gates 1008 and 1016 and inverters 1007,1009,1014, 1011 and 1017 interconnected in the manner indicated in FIG. 10. The references 0 and 1 indicate two respectively low and high permanent states.

In no other unit has started a run, the NCOUR signal is only the complement of the copy of signal NM. In the opposite case, the duration of the NCOUR signal (in the low state) exceeds that (high state) of the NM signal. The logic NAND gate 1013 electrically decouples these two signals, the low state of the NCOUR signal being indicated on the corresponding connection of the bus BAR by the interface producing the slowest NCOUR signal.

It is again pointed out that the logic gates, whose outputs are connected to the connections of the bus bar, must be of the "open collector" type, so that the low state preponderates over the high state.

The circuits described hereinbefore with reference to FIGS. 7 to 10 have only been given as non-limiting examples. It is obvious that the logic conditions connecting the different signals necessary for the satisfactory operation of the resource granting device according to the present invention can be satisfied by other logic circuit configurations and said logic circuits can be of a different technology to that described hereinbefore.

TABLE 1

| | |
|---|---|
| ACTIF: | Signal indicating that the resource has been allocated to a unit $U_i$. This signal is synchronized with the clock $H_i$ of unit $U_i$ if the NACT number corresponds to this unit. The ACTIF signal is synchronized with the end of the run in other cases. The signal is transitioned when $U_i$ frees the resource after the drop of DMB. The ACTIF signal does not change value when an operation is taking place. |
| ADR: | Connecting bus between the data exchange interfaces $I_{Di}$ conveying address words. |
| $DA_i$: | Local bus coupling a unit $U_i$ to its resource grant interfaces $I_{Ai}$. |
| BAR: | Bus coupling the resource grant interfaces $I_{Ai}$ comprising the PRIO and NACT buses and the NCOUR, NDEMA and PERSO connections. |
| BUS: | Data exchange connection channel between units $U_1$ to $U_n$, comprising the ADR, DON and SPE buses. |
| $BUS_i$: | Local bus coupling a data exchange interface $I_{Di}$ with the BUS channel. |
| DAR: | Resource granting device. |
| DMB: | Resource request signal, e.g. BUS channel request, active in the high state and permanently maintained when the request has not been satisfied. |
| DON: | Connecting bus between the data exchange interfaces $I_{Di}$ conveying data words. |
| $H_i$: | Clock signals from a unit $U_i$ of frequency $f_i$. |
| $2H_i$: | Clock signals transmitted to the interface $I_{Ai}$ by unit $U_i$ of frequency $2f_i$. |
| $I_{Ai}$: | Resource grant interface associated with unit $U_i$. |
| $I_{Di}$: | Data exchange interface associated with unit $U_i$. |
| LIBR: | Signal for the release of the resource by interface $I_{Ai}$, generated by unit $U_i$, active in the high state. |
| NCOUR: | Signal starting a run, active in the low state, blocks any other request after its rise, generated by a logic element of the "open collector" type. |

TABLE 1-continued

| | |
|---|---|
| NDEMA: | Resource request signal, e.g. from the BUS channel, active in the low state and positioned by all units. |
| NACT: | Multiple connection bus between the resource grant interfaces $I_{Ai}$ to $I_{An}$ conveying the complement of the number of the run-winning unit $U_i$ and generated by logic elements of the "open collector" type. |
| NSTA: | Number allocated to each unit $U_i$. |
| NSYNMEN: | Periodic signal generated by the data exchange interfaces $I_{DI}$ to $I_{Dn}$, active in the low state and of duration equal to a data transfer on the BUS channel at the initiative of a unit $U_i$, used for synchronizing the interface $I_{Ai}$ associated with unit $U_i$. |
| PERSO: | Signal indicating that there is no active unit, active in the low state and generated by a logic element of the "open collector" type. |
| PRIO: | Multiple conductor bus between the resource grant interfaces $I_{Ai}$ to $I_{An}$ conveying a word identifying the highest priority unit requesting the resource and generated by logic elements of the "open collector" type. |
| R: | Resource made available to competing units $U_I$ to $U_n$, e.g. the BUS channel. |
| S: | System comprising units $U_I$ to $U_n$. |
| SPE: | Connecting bus between the data exchange interfaces $I_{DI}$ to $I_{Dn}$ conveying service signals. |
| TIMEOUT: | Signal indicating the maximum time interval of the time allocated to unit $U_i$ if other units request management of the resource. |
| $U_i$: | Unit of system S of rank (I to n), processor or peripheral unit which can compete with at least one of the units $U_I$ to $U_n$ for access to a common resource. |

TABLE II

| | | CONTENT OF PRIOR-1 | | | | | |
|---|---|---|---|---|---|---|---|
| N° | NACT | NSTA | | NSTA | | NSTA | etc. |
| decimal | 3210 | 3210 | a3...a0 | 3210 | a3...a0 | 3210 | a3...20 |
| 1 | 0000 | 0000 | 1111 | 0001 | 0000 | 0010 | 0001 |
| 1 | 0001 | | 1110 | | 1111 | | 0000 |
| 2 | 0010 | | 1101 | | 1110 | | 1111 |
| 3 | 0011 | | 1100 | | 1101 | | 1110 |
| 4 | 0100 | | 1011 | | 1100 | | 1101 |
| 5 | 0101 | | 1010 | | 1011 | | 1100 |
| 6 | 0110 | | 1001 | | 1010 | | 1011 |
| 7 | 0111 | | 1000 | | 1001 | | 1010 |
| 8 | 1000 | | 0111 | | 1000 | | 1001 |
| 9 | 1001 | | 0110 | | 0111 | | 1000 |
| 10 | 1010 | | 0101 | | 0110 | | 0111 |
| 11 | 1011 | | 0100 | | 0101 | | 0110 |
| 12 | 1100 | | 0011 | | 0100 | | 0101 |
| 13 | 1101 | | 0010 | | 0011 | | 0100 |
| 14 | 1110 | | 0001 | | 0010 | | 0011 |
| 15 | 1111 | 0000 | 0000 | 0001 | 0001 | 0010 | 0010 |

TABLE III

| CONTENT OF PRIOR-2 | | | | | | | | | | | | |
|---|---|---|---|---|---|---|---|---|---|---|---|---|
| INPUTS ADDRESSES | | | | OUTPUTS PRIO | | | | | | | | |
| "PRIO-7" | a3 | a2 | a1 | a0 | 0 | 1 | 2 | 3 | 4 | 5 | 6 | — |
| | D7 | D6 | D5 | D4 | D3 | D2 | D1 | D0 | | | | |
| 0 | 1 | 0 | 0 | 0 | 0 | 0 | 0 | 0 | 0 | 0 | 0 | 0 |
| 0 | 1 | 0 | 0 | 1 | 0 | 0 | 0 | 0 | 0 | 0 | 1 | 0 |
| 0 | 1 | 0 | 1 | 0 | 0 | 0 | 0 | 0 | 0 | 1 | 1 | 0 |
| . | | | | | | | | | | | | |
| 0 | 1 | 1 | 1 | 1 | 1 | 1 | 1 | 1 | 1 | 1 | 1 | 0 |
| 0 | 0 | 0 | 0 | 0 | 1 | 1 | 1 | 1 | 1 | 1 | 1 | 1 |
| . | | | | | 1 | 1 | 1 | 1 | 1 | 1 | 1 | . |
| . | | | | | 1 | 1 | 1 | 1 | 1 | 1 | 1 | . |
| 0 | 0 | 1 | 1 | 1 | 1 | 1 | 1 | 1 | 1 | 1 | 1 | . |
| 1 | 1 | 0 | 0 | 0 | 1 | 1 | 1 | 1 | 1 | 1 | 1 | . |
| . | | | | | 1 | 1 | 1 | 1 | 1 | 1 | 1 | . |
| 1 | 1 | 1 | 1 | 1 | 1 | 1 | 1 | 1 | 1 | 1 | 1 | 1 |

TABLE III-continued

| CONTENT OF PRIOR-2 | | | | | | | | | | | | |
|---|---|---|---|---|---|---|---|---|---|---|---|---|
| INPUTS ADDRESSES | | | | OUTPUTS PRIO | | | | | | | | |
| "PRIO-7" | a3 | a2 | a1 | a0 | 0 | 1 | 2 | 3 | 4 | 5 | 6 | — |
| | D7 | D6 | D5 | D4 | D3 | D2 | D1 | D0 | | | | |
| 1 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 1 | 0 |
| . | | | | | | | | | | | | |
| 1 | 0 | 1 | 1 | 1 | 1 | 1 | 1 | 1 | 1 | 1 | 1 | 0 |

What is claimed is:

1. In a data processing system comprising at least two autonomous data processing units and a resource which may be used by said units and wherein each of said units is assigned an identification number and a priority level for requesting the use of said resource, and wherein each unit is provided with an interface means and a multiple-conductor channel to connect said interface means, a method for granting said resource to at least one of said units in a decentralized manner, comprising the steps of:

providing communications between said units, said communications consisting of first, second and third conditional control signals each capable of assuming a first or second logical state, a first binary word representing the priority level of the requesting unit which has the highest priority level, a second binary word representing the identification number of the unit which has been granted the use of said resource, determining whether any of said units has requested said resource, said request being signaled autonomously by any of said interface means positioning said first conditional control signal in said second logical state, determining whether said resource has been granted to any of said units, said granting being signaled by the interface means associated with the unit which has been granted said resource positioning said second conditional control signal in said second logical state, determining whether said unit is requesting said resource while at least one other unit is also requesting said resource thus necessitating a competition run among said requesting units to determine which unit will be granted said resource, said competition run being signaled by said interface means positioning said third conditional control signal in said second logical state, inhibiting other requests for said resource during said competition run, resolving said competition run by sampling said first binary word and calculating whether the priority level of said unit is higher than the priority levels of the other units within said run, validating the winning unit of said competition run after a predetermined period of time by the interface means associated with said winning unit transmitting said indentification number in said second binary word, positioning said third conditional control signal in said first logical state to allow new requests for said resource and a new competition run.

2. A method according to claim 1, wherein said first binary word is formed and displayed according to the following steps:

allocating a priority level to each of the units of the system;

transmitting on the multiple conductor channel the priority level of the first unit requesting allocation of the resource;

performing an iterative calculation of a new priority level by all units requesting allocation of the resource, by continuous comparisons of their priority level with the final priority level displayed on the multiple connection channel;

transmitting on the multiple connection channel a new priority level when the result of the comparison indicates that the priority level of the requesting unit is higher than the previously displayed priority level.

3. A method according to claim 1, wherein the allocation of the priority level to a unit takes place in a dynamic manner by calculating the difference between the identification number allocated to the requesting unit and the identification number of the final unit to which the resource was allocated.

4. A method according to claim 1, wherein the resource is allocated to a unit for a maximum time and after this maximum time has elasped the resource is again made available to the requesting units.

5. A method according to claim 1, wherein the third conditional control signal will not transition from the first to the second logic state unless the second conditional control signal is positioned at the first logic state, indicating that the resource is not allocated to any unit, and the first conditional control signal is positioned at the second logic state indicating that at least one unit is requesting the grant of the resource.

6. A method according to claim 1, comprising the further step of anticipating the validation step, wherein a unit to which the resource was allocated is again requesting the resource and has the highest priority level, after detecting said unit's new request during the transition of the third conditional control signal from the first logic state to the second, said interface means performs said validation step and the unit continues to have use of the resource before the third conditional control signal is changed back to the first logic state.

7. A method according to claim 1, comprising the further step of anticipating said competition run, wherein the activity of a unit to which the resource has been allocated is timed by a synchronization signal defining successive working and rest periods, and wherein the transition of the third conditional control signal from the first logic state to the second takes place under the control of the interface means associated with said unit during the final working period of said unit simultaneously with the detection of the first conditional control signal positioned at the second logic state indicating that at least one unit is requesting the grant of the resource.

8. A method according to claim 7, wherein the resource to be allocated is a multiple conductor bus channel for digital data exchange between the units and wherein the duration of the working period of the synchronization signal corresponds to the time necessary for performing a data transfer between two units coupled to said bus channel.

9. A method according to claim 1 wherein the third conditional control signal will not transition from the first to the second logic state unless a predetermined period of time assigned to the last unit which had been granted the resource has come to an end, and the first conditional control signal has been positioned in the second logical state indicating that at least one unit is requesting the resource, said positioning being brought about by the interface means of the requesting units.

10. In a data processing system comprising at least two autonomous data processing units and a resource which may be used by said units and wherein each of said units is assigned an identification number and a priority level for requesting the use of said resource, a device for granting said resource to at least one of said units in a decentralized manner, comprising:

multiple-conductor connecting means for providing communications between said units, said connecting means comprising:

first, second, and third bidirectional connecting conductors respectively conveying first, second, and third conditional control signals, each capable of assuming a first or second logical state;

a first group of conductors for conveying a binary word representing the priority level of the requesting unit which has the highest priority level;

a second group of conductors for conveying a binary word representing the identification number of the unit which has been granted the use of said resource;

interface means associated with each of said units and connected between said unit and said multiple-conductor connecting means for determining which one or which plurality of said units shall be granted said resource, comprising: (a) means for determining whether any of said units has requested said resource, said request being signaled autonomously by any of said interface means positioning said first conditional control signal in said second logical state; (b) means for determining whether said resource has been granted to any of said units, said granting being signaled by the interface means associated with the unit which has been granted said resource positioning said second conditional control signal in said second logical state; (c) means for determining whether said unit is requesting said resource while at least one other unit is also requesting said resource thus necessitating a competition run among said requesting units to determine which unit will be granted said resource, said competition run being signaled by said interface means positioning said third conditional control signal in said second logical state; (d) means for inhibiting other requests for said resource during said completion run, (e) means for resolving said competition run by sampling said first group of conductors and calculating whether the priority level of said unit is higher than the highest priority level carried on said first group of conductors; (f) means for validating the winning unit of said completion run after a predetermined period of time by the interface means associated with said winning unit transmitting said indentification number on said second group of conductors; (g) means for positioning said third conditional control signal in said first logical state to allow new requests for said resource and a new competition run, and wherein said interface means is coupled to said multiple-conductor connecting means by transmitting logic elements with semiconductor junctions of the open collector type in such a way that the second logic level preponderates over the first logic level.

11. A device according to claim 10, wherein the interface means receives from the unit associated therewith, a binary word representing its identification number, and wherein this number is generated by wired logic elements.

12. A device according to claim 11, wherein the interface means further comprises a priority level calculating means comprising a first non-volatile memory addressed by a binary word combining the binary word representing the associated unit identification number and the binary word representing the identification number of the last unit to which the resource was allocated, and wherein the output signals of said first memory represent the momentary relative priority of the associated unit.

13. A device according to claim 12, wherein the priority level calculating means further comprises second logic elements permitting the transmission of a binary word representing the identification number of said associated unit to said second group of conductors in response to an authorization signal, and wherein this authorization signal is processed by means of a memorizing logic element which memorizes said authorization signal and indicates that the associated unit has the highest momentary relative priority level at the time of the transition of the third conditional control signal from the first logic state to the second.

14. A device according to claim 13, wherein said memorizing logic element is a type D bistable flip-flop.

15. A device according to claim 12, wherein the priority level calculating means further comprises first logic elements receiving on the one hand the third conditional control signal and on the other hand a binary signal transmitted by the associated unit indicating that said unit is requesting the grant of the resource, whereby in response to the transition of the third, conditional control signal from the first to the second logic state, a storing logic element processes a permanent binary signal indicating the participation of the unit in said run, and wherein the output signals of said first memory, as well as said permanent binary signal are the input signals to a priority word processing circuit comprising a second non-volatile memory, the outputs of said priority word processing circuit being transmitted to the respective conductors of said first group of conductors, and said priority level calculating means also comprising a logic element processing a binary signal, whose second logic state indicates that the associated unit has the highest momentary relative priority level.

16. A device according to claim 10, wherein the interface means transmits to the unit associated therewith, a time based signal indicating that a predetermined period of time allocated thereto has elapsed, and wherein this signal is processed by an electronic circuit incorporating a monostable multivibrator actuated by a signal indicating that the unit has been validated for the grant of said resource, the predetermined period of time being determined by the value of the electrical capacitance of a capacitor associated with the monostable multivibrator.

17. A device according to claim 16, wherein said electronic circuit further comprises a logic gate which conditions the effective transmission of the time signal on the positioning of the first conditional control signal in the second logic state.

18. A device according to claim 10, wherein each of said units provides a series of clock pulse signals of a predetermined frequency, said units transmitting to said interface means associated therewith pulses of double the frequency of said clock pulse signals, said interface means further comprising third logic elements generating a permanent binary signal which is transmitted to said associated unit to indicate an activity state of said interface means after said unit has been selected to have the use of said resource, said third logic elements comprising a storage element for synchonrizing said clock signal on the first transition of the double frequency pulse signal following the transition of the third conditional control signal from the first to the second logic state.

* * * * *